United States Patent
De Rossi et al.

(10) Patent No.: US 11,773,013 B2
(45) Date of Patent: Oct. 3, 2023

(54) COMPOSITIONS FOR PRODUCING GLASS COATINGS BY WAY OF INKJET PRINTING TECHNIQUES AND USE THEREOF

(71) Applicant: MANKIEWICZ GEBR. & CO. (GMBH & CO. KG), Hamburg (DE)

(72) Inventors: Umberto De Rossi, Norderstedt (DE); Oliver Bolender, Hamburg (DE); Timo Steffen, Buxtehude (DE)

(73) Assignee: MANKIEWICZ GEBR. & CO. (GMBH & Co. KG), Hamburg (DE)

( * ) Notice: Subject to any disclaimer, the term of this patent is extended or adjusted under 35 U.S.C. 154(b) by 582 days.

(21) Appl. No.: 16/644,961

(22) PCT Filed: Aug. 14, 2018

(86) PCT No.: PCT/DE2018/100710
§ 371 (c)(1),
(2) Date: Mar. 6, 2020

(87) PCT Pub. No.: WO2019/047993
PCT Pub. Date: Mar. 14, 2019

(65) Prior Publication Data
US 2020/0369892 A1 Nov. 26, 2020

(30) Foreign Application Priority Data
Sep. 10, 2017 (DE) ............ 10 2017 008 457.2

(51) Int. Cl.
| | |
|---|---|
| *C03C 17/00* | (2006.01) |
| *C08F 220/20* | (2006.01) |
| *B41M 5/00* | (2006.01) |
| *C08F 2/48* | (2006.01) |
| *C08F 224/00* | (2006.01) |
| *C08K 5/5397* | (2006.01) |
| *C08L 33/08* | (2006.01) |
| *C08L 33/10* | (2006.01) |
| *C08L 67/00* | (2006.01) |
| *C08L 71/00* | (2006.01) |
| *C08L 75/04* | (2006.01) |
| *C08L 83/04* | (2006.01) |
| *C09D 4/06* | (2006.01) |
| *C09D 5/00* | (2006.01) |

(52) U.S. Cl.
CPC ........... *C03C 17/005* (2013.01); *B41M 5/007* (2013.01); *B41M 5/0047* (2013.01); *C08F 2/48* (2013.01); *C08F 220/20* (2013.01); *C08F 224/00* (2013.01); *C08K 5/5397* (2013.01); *C08L 33/08* (2013.01); *C08L 33/10* (2013.01); *C08L 67/00* (2013.01); *C08L 71/00* (2013.01); *C08L 75/04* (2013.01); *C08L 83/04* (2013.01); *C09D 4/06* (2013.01); *C09D 5/002* (2013.01); *B41M 2205/42* (2013.01)

(58) Field of Classification Search
CPC .............. C03C 17/005; C03C 2217/72; C03C 2217/78; C03C 2218/119; C03C 17/32; C03C 17/3405; B41M 5/0047; B41M 5/007; B41M 2205/42; C08F 2/48; C08F 220/20; C08F 224/00; C08K 5/5397; C08L 33/08; C08L 33/10; C08L 67/00; C08L 71/00; C08L 75/04; C08L 83/04; C09D 4/06; C09D 5/002; C09D 4/00
USPC .................................................. 522/113, 120
See application file for complete search history.

(56) References Cited

U.S. PATENT DOCUMENTS

| | | | |
|---|---|---|---|
| 5,128,391 A | 7/1992 | Shustack | |
| 7,781,493 B2* | 8/2010 | Baikerikar | C09D 5/00 525/29 |
| 7,955,696 B2* | 6/2011 | Baikerikar | H01B 1/22 428/689 |
| 8,748,506 B2* | 6/2014 | Jin | C09D 4/00 522/90 |
| 2007/0077896 A1 | 4/2007 | Ho et al. | |
| 2007/0172637 A1 | 7/2007 | Hayes et al. | |
| 2012/0077896 A1* | 3/2012 | Ishima | B41M 5/0047 522/75 |
| 2017/0210908 A1 | 7/2017 | Tian et al. | |

FOREIGN PATENT DOCUMENTS

WO    WO 2010/140360 A1    11/2012

* cited by examiner

*Primary Examiner* — Sanza L. McClendon
(74) *Attorney, Agent, or Firm* — Norman B. Thot

(57) ABSTRACT

A coating material for the production of a UV-curing primer coating. The coating material includes at least 60 to 90 wt.-% of at least one monofunctional cycloaliphatic acrylate monomer or at least one monofunctional aryloxy alkyl acrylate monomer, 1 to 10 wt.-% of at least one amino-functional silane, 1 to 10 wt.-% of at least one photoinitiator, and up to 10 wt.-% of at least one of at least one acrylate oligomer and at least one methacrylate oligomer, each based on a total weight of the coating material.

7 Claims, No Drawings

COMPOSITIONS FOR PRODUCING GLASS COATINGS BY WAY OF INKJET PRINTING TECHNIQUES AND USE THEREOF

CROSS REFERENCE TO PRIOR APPLICATIONS

This application is a U.S. National Phase application under 35 U.S.C. § 371 of International Application No. PCT/DE2018/100710, filed on Aug. 14, 2018 and which claims benefit to German Patent Application No. 10 2017 008 457.2, filed on Sep. 10, 2017. The International Application was published in German on Mar. 14, 2019 as WO 2019/047993 A1 under PCT Article 21(2).

FIELD

The present invention relates to coating materials and their use for the production of coatings and coating systems for glass surfaces. The present invention further relates to digital methods for printing on glass substrates, in particular flat glass and glass-formed containers.

BACKGROUND

Digital printing methods or digital printing is/are defined as printing methods whose print image is directly transmitted from a computer to a printing unit without any use of a static printing form. Known digital printing methods are electrophotographic printing methods and inkjet printing methods.

Inkjet printing methods are usually used for the decoration of glass surfaces. The required durability of the decoration of, for example, drinking glasses, beverage bottles and other glass packaging has to date only be achieved via complex multilayered coating systems, with the glass surfaces first being pre-treated by flame-pyrolytic surface silicating technology. A primer layer is subsequently applied, with the primer coating material or the primer coating materials being applied to the pre-treated glass surface either by dipping, spraying, rolling or wiping. Common printing methods such as, for example, serigraphy, are also alternatively employed.

The term "primer layer" or "primer coating" as used herein is understood as the first layer of a coating system that is applied to a substrate. The primer layer may consist of one or more coatings, which is/are produced from one or more coating materials. The decorative layer containing one or more ink coatings that has been produced from inks via inkjet printing methods is applied to the primer layer. A top coat layer consisting of one or more one top coats is lastly applied to the decorative layer. The top coats can be applied by inkjet printing methods or by common printing or coating methods. The term "top coat" as used herein is understood as the topmost layer of a coating system, which protects the subjacent layers from mechanical damage and chemical stress.

A disadvantage of the printing used to date is the employment of different application, curing and printing methods that are work and time intensive. The primer coating materials usually used also exhibit a solvent content of more than 90 wt.-% so that some time is required for the solvent to evaporate out of the applied layer after application of the coating materials. In addition thereto, higher amounts of solvent vapors are produced which must be conducted away in a complex manner. A further disadvantage is that usual primer coating materials cannot automatically be reliably applied by inkjet printing techniques. That means that a further application technology must be integrated in the printing unit.

US 2012/0077896 A1 describes radiation-curable inkjet inks which exhibit a good adhesiveness to glass surfaces. They cure to become alcohol- and water-resistant coatings which do not require any further primer coatings or top coats. The coatings thus obtained are not, however, sufficiently scratch- and water-resistant, and they are dishwasher safe only to a small extent.

SUMMARY

An aspect of the present invention is to provide improved coating systems for the decoration of glass bodies via inkjet printing methods, as well as improved methods for printing on glass surfaces.

In an embodiment, the present invention provides a coating material for the production of a UV-curing primer coating. The coating material includes at least 60 to 90 wt.-% of at least one monofunctional cycloaliphatic acrylate monomer or at least one monofunctional aryloxy alkyl acrylate monomer, 1 to 10 wt.-% of at least one amino-functional silane, 1 to 10 wt.-% of at least one photoinitiator, and up to 10 wt.-% of at least one of at least one acrylate oligomer and at least one methacrylate oligomer, each based on a total weight of the coating material.

DETAILED DESCRIPTION

Decorations printed on glass surfaces, especially decorations on articles of daily use such as, for example, beverage bottles and drinking glasses, must be scratch- and water-resistant and dishwasher safe. It has turned out that the radiation-curable primer coatings according to the present invention provide a strong anchoring between the glass surface and the coating system. Adhesiveness and durability of the decoration coatings printed via inkjet printing methods are in particular significantly improved.

According to the present invention, the primer coatings are produced from coating materials comprising at least 60 to 90 wt.-% of monofunctional cycloaliphatic acrylate monomers or monofunctional aryloxy alkyl acrylate monomers, 1 to 10 wt.-% of amino-functional silanes, 1 to 10 wt.-% of photoinitiators, up to 10 wt.-% of acrylate oligomers and/or methacrylate oligomers, as well as up to 1 wt.-% of surfactants, each based on the total weight of the coating material. Phenoxyethyl acrylates and/or trimethylol-propane formal acrylates can, for example, be used as acrylate monomers. According to the present invention, the monofunctional acrylate monomers can, for example, be employed in quantities of 70 to 90 wt.-%, for example, 80 to 90 wt.-%, each based on the total weight of the coating material.

Bis[(3-trimethoxysilyl)propyl]amine and aminopropyltriethoxysilane can, for example, be used as amino-functional silanes. According to the present invention, the silanes can, for example, be employed in quantities of 1 to 8 wt.-%, for example, 2 to 7 wt.-%, each based on the total weight of the coating material.

Suitable photoinitiators are phosphine oxide derivatives. Bis(2,4,6-trimethylbenzoyl)-phenylphosphine oxide and 2,4,6-trimethylbenzoyl-diphenylphosphine oxide can, for example, be used as photoinitiators. According to the present invention, the photoinitiators can, for example, be employed in quantities of 2 to 9 wt.-%, based on the total weight of the coating material.

Suitable acrylate oligomers and methacrylate oligomers are polyester acrylate oligomers, polyester methacrylate oligomers, polyether acrylate oligomers, polyether methacrylate oligomers, urethane acrylate oligomers, and urethane methacrylate oligomers. Polyester acrylate oligomers and urethane methacrylate oligomers can, for example, be used as oligomers. According to the present invention, the acrylate oligomers and/or methacrylate oligomers can, for example, be employed in quantities of 0.01 to 10 wt.-%, for example, 1 to 10 wt.-%, for example, 1 to 8 wt.-%, each based on the total weight of the coating material.

Suitable surfactants are modified poly(organo)siloxanes. Silicone polyether derivatives can, for example, be used as surfactants. According to the present invention, the surfactants can, for example, be employed in quantities of 0.01 to 1 wt.-%, based on the total weight of the coating material. The primer coating materials may additionally contain further auxiliary agents and additives known to and commonly used by a skilled person, such as, for example, polymerization inhibitors or defoamers.

The primer coatings according to the present invention are cured by radiation in a wavelength range of between 450 and 180 nm. The employed radiation may be generated, for example, by ultraviolet light emitting diodes (LED) or by mercury vapor lamps. LED spots, for example, with a power of 10 to 20 W, or medium pressure mercury lamps with a power of 200 to 500 W/cm can therefore be employed.

In an embodiment of the present invention, the coatings obtained from the coating materials according to the present invention are employed as primer layers on glass surfaces. They are particularly employed as primer layers in coating systems for the decoration of glass surfaces on which inkjet methods effect printing.

In an embodiment, the present invention provides a coating system for the decoration of a glass surface comprising a primer layer produced from at least one primer coating, a decorative layer produced from at least one ink layer, and a top coat layer produced from at least one top coat.

The primer coatings are produced from UV-curing coating materials containing at least 60 to 90 wt.-% of monofunctional cycloaliphatic acrylate monomers or monofunctional aryloxy alkyl acrylate monomers, 1 to 10 wt.-% of amino-functional silanes, and 1 to 10 wt.-% of photoinitiators. The primer coating materials may also contain up to 10 wt.-% of acrylate oligomers and/or methacrylate oligomers as well as up to 1 wt.-% of surfactants.

UV-curing inks which are suitable for inkjet printing method are employed for the production of the coatings of the decorative layer. The inkjet inks can, for example, contain pigments, oligomers, photoinitiators, and reactive diluents. They can also contain further additives known to and commonly used by a skilled person.

In order to improve the print image, in a first step, light, for example, white ink coatings, may be applied to the primer layer. These coatings are produced from inkjet inks that can, for example, contain white pigments. The color inks are subsequently applied to the white ink coatings. Those inks which contain the usual colors for color printing are employed for this purpose.

For the production of the top coat layer, transparent coatings can, for example, be employed which are produced from UV-curing clear coats. The term "clear coat" as used herein is understood as a coating material which provides a transparent coating, and which may also have decorative and technical effects in addition to protective properties. Suitable clear coats according to the present invention are oligomers, reactive diluents, and photoinitiators and, if need be, further additives known to and commonly used by a skilled person.

The coating system according to the present invention leads to particularly durable print images, which correspond in particular to the requirements on decorations of food containers like beverage bottles and drinking glasses. They exhibit a high scratch and water resistance and are highly dishwasher safe.

In an embodiment, the present invention also provides a method for printing on glass surfaces having the following steps:

(a) Applying at least one primer coating material via inkjet printing methods;
(b) Pre-gelling of the applied coating material or the applied primer coating materials by UV radiation;
(c) Applying at least one ink via inkjet printing methods;
(d) Pre-gelling of the applied ink or the applied inks by UV radiation;
(e) Applying at least one clear coat by inkjet printing methods;
(f) Curing of the entire layer construction by UV radiation.

LED spots emitting radiation with a wavelength of 385 or 395 nm can, for example, be used as radiation source for the pre-gelling or pinning in steps (b) and (d). Power thereby lies between 2 and 5 W. Radiation can, for example, be effected with a dose in the range of between 20 and 100 mJ/cm$^2$.

In the last step (f), the entire layer construction, which comprises a primer layer consisting of the pre-gelled primer coatings, a decorative layer consisting of the pre-gelled ink coatings, and a top coat layer consisting of the pre-gelled clear coats, is completely cured by radiation with rays or light in a wavelength range of between 450 and 180 nm. Medium pressure mercury lamps having a power of, for example, 200 to 500 W/cm, and a dose of 500 to 2000 mJ/cm$^2$ can, for example, be used for this purpose.

In an embodiment of the method of the present invention, steps (c) and (d) are executed by use of white inks in a first step, and are then repeated using color inks. In so doing, light, for example, white ink coatings, are generated on which the actual image or decoration is printed. A significantly improved print image is thereby obtained due to the white ground, especially on color or dark substrate surfaces.

The UV-curing primer coating materials, inks and clear coats are applied by commercially available inkjet printers. Inkjet printers that are suitable for printing on molded objects can, for example, be employed. The printed coating materials are pre-gelled or exposed to pinning. The terms "pre-gelling" and "pinning" as used herein are understood as the fixation of a coating material through a pre-reaction. The coating material is pre-gelled, i.e., it is pre-cured to an extent that it is no longer liquid. It already develops a sufficiently hard coating, which, however, is not yet completely cured. This method avoids undesirable running and improves adhesion of the coating materials.

In the last step, the entire layer construction consisting of primer layer, decorative layer, and top coat layer is completely cured. The coatings cross-link to generate very stable layer constructions during this final curing of all imprinted and pre-gelled layers. In order to improve chemical and mechanical bonding of the primer layer, a further embodiment of the present invention provides that the glass surface may be pre-treated by flame-pyrolytic surface silicating prior to printing. In this process, the oxidative reaction of organic silicon compounds such as, for example, silanes, leads to a solid nanoporous silicate layer which partially hydrolyzes. Reactive hydroxyl groups are thus created and the surface energy increases.

The method according to the present invention can be executed with a chart speed of 5 to 20 m/minute which is common for production lines. It can therefore easily be integrated as an in-line method for the decoration of glass. Because primer coating materials, inks and clear coats are each applied by inkjet printing methods, it is possible to employ only one print module for these in-line methods.

The method according to the present invention is suitable for printing on flat glass and glass-formed containers, in particular for printing on drinking glasses, beverage bottles and glass packaging for food.

EXAMPLE

Example 1

Composition of the Primer Coating Material

| Constituent | Quantity [% by weight] |
|---|---|
| Phenoxyethyl acrylate | 83.5 |
| Urethane methacrylate oligomer | 5.0 |
| Bis[(3-trimethoxysilyl)propyl]amine | 5.0 |
| Silicone polyether acrylate | 0.5 |
| Bis(2,4,6-trimethylbenzoyl)-phenylphosphine oxide | 3.0 |
| 2,4,6-trimethylbenzoyl-diphenylphosphine oxide | 3.0 |

Printing Method

A commercially available inkjet printing plant for rotationally symmetric bodies with a print head type Konica Minolta KM1024 was used for printing. Printing was performed on commercially available drinking glasses. In a first step, the glass surfaces were pre-treated by flame-pyrolytic surface silicating. The primer coating material according to Example 1 was then imprinted with a resolution of 360×360 dpi with a printing speed of 20 m/min. A pinning of the imprinted coatings by an LED spot with a power of 2 W at a wavelength of 395 nm was then performed. On the pre-gelled primer coating, a commercially available white UV-curing inkjet ink was imprinted with a resolution of 360×360 dpi and a printing speed of 20 m/min. A pinning of the imprinted coating was then performed with an LED spot with a power of 2 W at a wavelength of 395 nm. Commercially available UV-curing inkjet color inks were printed on the pre-gelled white ink coating with a resolution of 360×360 dpi and a printing speed of 20 m/min. A pinning of the imprinted coating with an LED spot with a power of 2 W at a wavelength of 395 nm was then performed. A commercially available UV-curing clear coat that is suitable for inkjet printers was printed on the pre-gelled color ink coatings with a resolution of 360×360 dpi and a printing speed of 20 m/min. All imprinted and pre-gelled coatings were then cured by radiation via a medium-pressure mercury lamp with a power of 270 W/cm.

Determination of Scratch Resistance

A weight-loaded scratch stylus (model Erichsen 435S) was placed with its tip on the coating to be tested and was then, vertically upright, pulled over the surface to be tested. It was then visually assessed whether the tested coating had a scratching track. The maximum mass of weight with which the scratch stylus can be loaded without the coating being damaged during the test is a measure of the scratch resistance of the coating. A result of 5 newtons or more without damage on the coating is considered as being a good scratch resistance.

Determination of Adhesion (Cross-Cut Test)

For a cross-cut, six parallel cuts were applied to the coating of the test specimens with a cutter knife. The cuts in the coating were thereby so deep that they reached the substrate surface without damaging it. Six further parallel cuts were then applied which were perpendicular to the first ones so as to form an even square or lattice. The grid spacing was 1 mm. A clear or crepe tape strip with an adhesive force of 8 to 10 N/25 mm was stuck onto the resulting square. This was then removed at an angle of 60° in a time of 0.5 to 1 s. The grid or coating was then assessed visually. The grid cut characteristic value Gt 0 thereby corresponds to a very good adhesive strength, and the characteristic value Gt 5 corresponds to a very poor adhesive strength.

Determination of Adhesion (Tape Test)

On the coated specimen, an adhesive tape strip (type Tesa-Film 57370-00002) was fixed on the coating to be tested using light pressure and avoiding inclusions of air. After a wait of 10 seconds, the adhesive tape strip was removed in an angle of 60° and visually assessed. The result is considered to be good if no residues can be seen on the adhesive tape strip.

Determination of Water Resistance

The specimen was completely immersed into water for 3 days at a temperature of 23° C. The specimen was then removed from water and without reconditioning its adhesion (cross-cut test and tape test) and scratch resistance were checked. Water resistance is considered to be good if the three tests after immersion of the specimens into water do not provide worse results than prior to the immersion into water.

Dishwasher Proof Determination of the Specimens

The specimen was washed in a commercially available industrial dishwasher with a commercially available industrial dishwashing liquid for 10 minutes at a temperature of 60 to 75° C. The coating surface was then visually assessed, with the surface being particularly evaluated with respect to changes in surface and color. After a 10 minute reconditioning at 23° C. and at 50% relative humidity of air, the cross-cut test and tape test were performed. The quantity of wash cycles without worsening of the test results was then determined.

The test results are summarized in the following table.

Table: Summary of Results

| Test | Result directly after curing | Result after immersion into water | Result after 1000 wash cycles |
|---|---|---|---|
| Scratch resistance | >5N | >5N | >5N |
| Cross-cut test | GT 0 | GT 0 | GT 0 |
| Tape test | no residue | no residue | no residue |
| Visual assessment | Reference | no change | no change |

All specimens exhibit a good adhesion of the coating to the substrate as well as a high scratch resistance, which do not worsen after cleaning processes. The influence of water, chemicals and temperature as it occurs with usual cleaning methods do not reveal any recognizable effect on the glass coating.

The present invention is not limited to embodiments described herein; reference should be had to the appended claims.

What is claimed is:

1. A coating system for the decoration of a glass surface, the coating system comprising:
   a primer layer comprising at least one primer coating, the at least one primer coating being produced from a coating material comprising,
      at least 60 to 90 wt.-% of at least one monofunctional cycloaliphatic acrylate monomer or at least one monofunctional aryloxy alkyl acrylate monomer,
      1 to 10 wt.-% of at least one amino-functional silane,
      1 to 6 wt.-% of at least one photoinitiator, and
      0.01 to 8 wt.-% of at least one of at least one acrylate oligomer and at least one methacrylate oligomer,
      each based on a total weight of the coating material,
      wherein,
         the at least one photoinitiator is a phosphine oxide derivative;
   a decorative layer comprising at least one ink coating; and
   a top coat layer comprising at least one top coat.

2. The coating system as recited in claim 1, wherein the at least one ink coating is produced via at least one UV-curing inkjet ink.

3. The coating system as recited in claim 1, wherein the at least one top coat is produced from a UV-curing clear coat.

4. A method for printing on a glass surface, the method comprising the steps of:
   (a) applying to the glass surface via an inkjet printing method at least one coating material comprising,
      at least 60 to 90 wt.-% of at least one monofunctional cycloaliphatic acrylate monomer or at least one monofunctional aryloxy alkyl acrylate monomer,
      1 to 10 wt.-% of at least one amino-functional silane,
      1 to 6 wt.-% of at least one photoinitiator, and
      0.01 to 8 wt.-% of at least one of at least one acrylate oligomer and at least one methacrylate oligomer,
      each based on a total weight of the coating material,
      wherein,
         the at least one photoinitiator is a phosphine oxide derivative;
   (b) pre-gelling of the at least one coating material applied via UV radiation;
   (c) applying at least one ink via the inkjet printing method to the pre-gelled at least one coating material;
   (d) pre-gelling of the at least one ink applied via UV radiation;
   (e) applying at least one clear coat via the inkjet printing method to the pre-gelled at least one ink, to thereby obtain a layer construction; and
   (f) curing the layer construction via UV radiation.

5. The method as recited in claim 4, further comprising repeating the steps of:
   (c) applying at least one ink via the inkjet printing method to the pre-gelled at least one coating material; and
   (d) pre-gelling of the at least one ink applied via UV radiation, as,
   (c1) applying at least one white ink via the inkjet printing method to the pre-gelled at least one coating material;
   (d1) pre-gelling of the at least one white ink applied via UV radiation;
   (c2) applying at least one color ink via the inkjet printing method to the pre-gelled at least one white ink; and
   (d2) pre-gelling of the at least one color ink applied via UV radiation.

6. A method of using the method as recited in claim 4 to print on at least one of a flat glass and a glass-formed container, the method comprising:
   providing at least one of the flat glass and the glass-formed container; and
   printing on at least one of the glass surface and the glass-formed container via the method as recited in claim 4.

7. The method of using as recited in claim 6, wherein the at least one of the flat glass and the glass-formed container includes a drinking glass, a beverage bottle, and a glass packaging for food.

* * * * *